(12) United States Patent
Guillaume et al.

(10) Patent No.: US 11,394,308 B1
(45) Date of Patent: Jul. 19, 2022

(54) APPARATUSES AND METHODS FOR POWER ISOLATION

(71) Applicant: Arm Limited, Cambridge (GB)

(72) Inventors: Jacques Bernard Claude Guillaume, Roquefort-les-Pins (FR); Mikael Yves Marie Rien, Bernin (FR); Fabio Toni Braz, Mougins (FR); Jeremy Patrick Dubeuf, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/308,148

(22) Filed: May 5, 2021

(51) Int. Cl.
*H02M 3/335* (2006.01)
*H02M 7/04* (2006.01)

(52) U.S. Cl.
CPC ......... *H02M 3/33592* (2013.01); *H02M 7/05* (2021.05)

(58) Field of Classification Search
CPC ............................ H02M 3/33592; H02M 7/05
USPC ........................................................ 327/143
See application file for complete search history.

(56) References Cited

U.S. PATENT DOCUMENTS

| | | | |
|---|---|---|---|
| 5,357,419 A | 10/1994 | Limpaecher | |
| 5,905,361 A | 5/1999 | Saeki | |
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,424,585 B1 | 7/2002 | Ooishi | |
| 6,510,518 B1 | 1/2003 | Jaffe et al. | |
| 6,539,092 B1 | 3/2003 | Kocher | |
| 6,625,737 B1 | 9/2003 | Kissell | |
| 6,654,884 B2 | 11/2003 | Jaffe et al. | |
| 6,976,178 B1 | 12/2005 | Kissell | |
| 6,985,024 B2 | 1/2006 | Geen | |
| 7,318,145 B1 | 1/2008 | Stribaek et al. | |

(Continued)

FOREIGN PATENT DOCUMENTS

WO       2010/008586 A2       1/2010

OTHER PUBLICATIONS

International Search Report and Written Opinion of the International Searching Authority dated Aug. 16, 2018 in PCT/GB2018/051379, 12 pages.

(Continued)

*Primary Examiner* — Tomi Skibinski
(74) *Attorney, Agent, or Firm* — Nixon & Vanderhye P.C.

(57) ABSTRACT

There are provided apparatuses and methods. The apparatus comprise a power input and a power output and a first isolation circuit comprising a charge store. The first isolation circuit is configured to switch between a first mode and a second mode at a switching frequency. In the first mode the charge store is coupled to the power input and is electrically isolated from an intermediate power node. In the second mode the charge store is coupled to the intermediate power node and is electrically isolated from the power input. The apparatus further comprises a second isolation circuit electrically coupled to the intermediate power node and the power output. The second isolation circuit is configured to output an output voltage at the power output. The second isolation circuit is configured to generate the output voltage by filtering the intermediate voltage signal to reduce signal components at the switching frequency.

24 Claims, 8 Drawing Sheets

(56) References Cited

U.S. PATENT DOCUMENTS

| | | | |
|---|---|---|---|
| 7,453,285 | B2 | 11/2008 | Kiel et al. |
| 7,506,165 | B2 | 3/2009 | Kocher et al. |
| 7,583,113 | B2 | 9/2009 | Celani |
| 7,587,044 | B2 | 9/2009 | Kocher et al. |
| 7,599,488 | B2 | 10/2009 | Kocher et al. |
| 7,620,832 | B2 | 11/2009 | Kissell |
| 7,634,083 | B2 | 12/2009 | Kocher et al. |
| 7,668,310 | B2 | 2/2010 | Kocher et al. |
| 7,787,620 | B2 | 8/2010 | Kocher et al. |
| 7,792,287 | B2 | 9/2010 | Kocher et al. |
| 7,880,339 | B2 | 2/2011 | Tokunaga |
| 7,925,814 | B2 | 4/2011 | Schneiderwind |
| 7,941,666 | B2 | 5/2011 | Kocher |
| 8,247,924 | B1 | 8/2012 | Zoller |
| 8,330,493 | B2 | 12/2012 | Myers et al. |
| 8,386,800 | B2 | 2/2013 | Kocher et al. |
| 8,525,545 | B1 | 9/2013 | May |
| 8,707,052 | B2 | 4/2014 | Kocher et al. |
| 8,860,465 | B2 | 10/2014 | Myers et al. |
| 8,879,724 | B2 | 11/2014 | Kocher et al. |
| 8,912,814 | B2 | 12/2014 | Yannette et al. |
| 8,912,816 | B2 | 12/2014 | Yannette et al. |
| 8,947,048 | B2 | 2/2015 | Roessler |
| 8,977,864 | B2 | 3/2015 | Kocher et al. |
| 9,143,005 | B1 | 9/2015 | Laird |
| 9,154,132 | B2 | 10/2015 | Yannette et al. |
| 9,312,861 | B2 | 4/2016 | Myers et al. |
| 9,430,678 | B2 | 8/2016 | Yannette et al. |
| 9,778,669 | B2 | 10/2017 | Kim |
| 10,924,261 | B2 | 2/2021 | Harrison et al. |
| 10,997,322 | B2 | 5/2021 | Fleming et al. |
| 2003/0210018 | A1 | 11/2003 | Tscheternigg |
| 2005/0024962 | A1 | 2/2005 | Chan |
| 2008/0044041 | A1 | 2/2008 | Tucker |
| 2008/0150619 | A1 | 6/2008 | Lesso |
| 2008/0150620 | A1 | 6/2008 | Lesso |
| 2008/0150621 | A1* | 6/2008 | Lesso ............... H02M 3/07 327/536 |
| 2009/0135171 | A1 | 5/2009 | Chen |
| 2012/0001683 | A1 | 1/2012 | Wang |
| 2012/0139577 | A1 | 6/2012 | Lee |
| 2014/0132337 | A1 | 5/2014 | Yannette |
| 2014/0167837 | A1 | 6/2014 | Yannette |
| 2016/0109933 | A1 | 4/2016 | Damle |
| 2017/0063376 | A1 | 3/2017 | Bell et al. |
| 2017/0310120 | A1 | 10/2017 | Birkl |

OTHER PUBLICATIONS

A. Gornik et al., "A Hardware-based Countermeasure to Reduce Side-Channel Leakage—Design, Implementation, and Evaluation" in IEEE Transactions on Computer-Aided Design of Integrated Circuits and Systems, vol. 34, No. 8, Aug. 2015, pp. 1308-1319.

Office Action for EP Application No. 18729485.5 dated Dec. 11, 2020, 4 pages.

Office Action dated Sep. 18, 2020 in U.S. Appl. No. 15/967,900, 24 pages.

Final Office Action dated Jun. 1, 2020 in U.S. Appl. No. 15/967,900, 27 pages.

Office Action dated Dec. 12, 2019 in U.S. Appl. No. 15/967,900, 19 pages.

Office Action dated May 31, 2019 in U.S. Appl. No. 15/967,900, 27 pages.

Office Action dated Apr. 3, 2020 for U.S. Appl. No. 15/600,974, 22 pages.

Final Office Action dated Oct. 18, 2019 in U.S. Appl. No. 15/600,974, 25 pages.

Office Action dated Feb. 25, 2019 in U.S. Appl. No. 15/600,974, 22 pages.

Office Action for EP Application No. 18729485.5 dated Aug. 4, 2021, 4 pages.

* cited by examiner

APPARATUSES AND METHODS FOR POWER ISOLATION

TECHNICAL FIELD

The present invention relates to data processing. More particularly the present invention relates to power isolation.

BACKGROUND

Apparatuses for power isolation provide a power output that is electrically isolated from a power input. This can be achieved, for example, using an isolation circuit comprising a charge store that is charged from a power input whilst isolating a power output and that outputs power to the power output whilst isolating the power input. Such techniques provide power isolation by filtering signals from the power output side such that they are more difficult to detect at the power input. Using these techniques power isolation can be provided at frequencies that are filtered by the isolation circuit.

SUMMARY

In some example configurations described herein there is an apparatus comprising: a power input; a power output; a first isolation circuit comprising a charge store and configured to switch between a first mode and a second mode at a switching frequency, wherein in the first mode the charge store is coupled to the power input and is electrically isolated from an intermediate power node, and in the second mode the charge store is coupled to the intermediate power node and is electrically isolated from the power input; and a second isolation circuit electrically coupled to the intermediate power node and the power output, and configured to output an output voltage signal at the power output of lower voltage than an intermediate voltage signal of the intermediate power node, wherein the second isolation circuit is configured to generate the output voltage signal by filtering the intermediate voltage signal to reduce signal components at the switching frequency.

In some example configurations described herein there is a method of operating an apparatus comprising switching a first isolation circuit between a first mode and a second mode at a switching frequency, wherein in the first mode a charge store is coupled to a power input and is electrically isolated from an intermediate power node, and in the second mode the charge store is coupled to the intermediate power node and is electrically isolated from the power input; generating an output voltage signal at a power output of lower voltage than an intermediate voltage signal of the intermediate power node, the output voltage signal generated from the intermediate voltage signal filtered to reduce signal components at the switching frequency.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
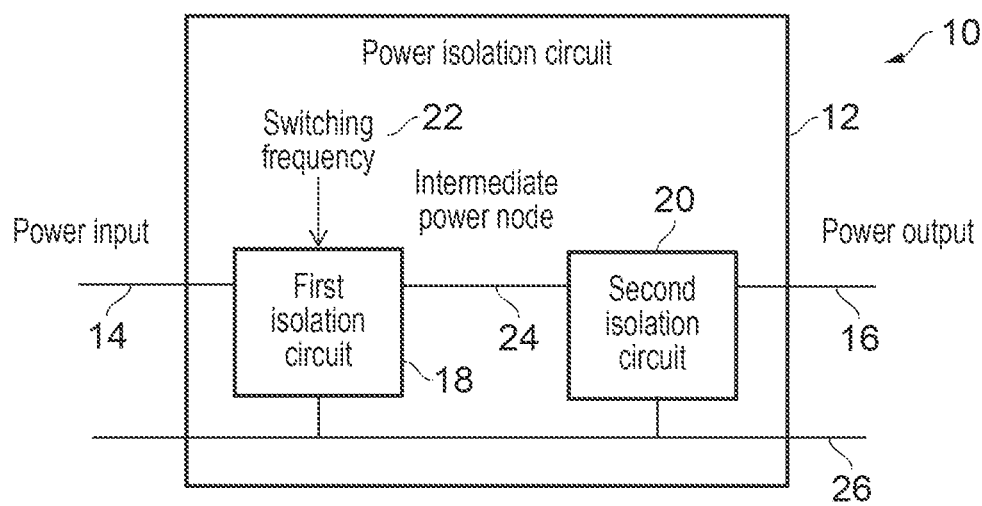
FIG. 1a schematically illustrates an apparatus for power isolation in accordance with some example configurations.

Before discussing the embodiments with reference to the accompanying figures, the following description of embodiments is provided.

In accordance with some example configurations there is provided an apparatus comprising a power input and a power output. The apparatus further comprises a first isolation circuit comprising a charge store. The first isolation circuit is configured to switch between a first mode and a second mode at a switching frequency. In the first mode the charge store is coupled to the power input and is electrically isolated from an intermediate power node, and in the second mode the charge store is coupled to the intermediate power node and is electrically isolated from the power input. The apparatus further comprises a second isolation circuit electrically coupled to the intermediate power node and the power output. The second isolation circuit is configured to output an output voltage signal at the power output of lower voltage than an intermediate voltage signal of the intermediate power node. The second isolation circuit is also configured to generate the output voltage signal by filtering the intermediate voltage signal to reduce signal components at the switching frequency.

The first isolation circuit provides power isolation (power obfuscation) by electrically isolating the intermediate voltage node from the power input by switching between the first mode and the second mode at the switching frequency. Electrical isolation between a first node and a second node means that the first isolation circuit is configured such that the current pathway between the first node and the second node is negligible. For example, electrical isolation could be achieved through a switch in an open state placed between the first node and the second node. Alternatively, electrical isolation could be provided using a switchable electrical component placed between the first node and the second node to minimise the current flow between the first node and the second node. Power obfuscation using the isolation circuits is provided because a direct measurement of the current drawn at the intermediate voltage node cannot be achieved by measuring the current drawn at the power input.

Typically, in order to provide a stable voltage at the intermediate power node, where the output voltage required is the same as the input voltage, the first power isolation circuit requires large components operated at a high switching frequency resulting in high power consumption. The inventors have realised that improved power obfuscation can be achieved using a second isolation circuit, coupled (connected) to the intermediate power node and the power output, to provide a further level of filtering of the power supply. The second isolation circuit reduces the voltage provided at the intermediate voltage node and, by choosing the second isolation circuit such that the intermediate voltage is filtered to reduce signal components at the switching frequency, an output voltage that is stable over a range of intermediate voltages can be provided. As a result the requirement for large components operated at a high frequency can be overcome resulting in a power obfuscation circuit with improved power efficiency. For example in some configurations the power input is provided with an input voltage between 1.5 volts and 1.8 volts. The intermediate voltage, that is output from the first isolation circuit, will therefore vary between a peak voltage defined by the input voltage and a minimum that is based on the switching frequency and the current drawn at the power output. The second isolation circuit filters the intermediate voltage to reduce frequency components at the switching frequency to output a stable voltage between 0.8 volts and 0.6 volts.

Additional techniques can be used to increase the power obfuscation provided by the apparatus. In some example configurations the first isolation circuit is further configured to operate in a third mode in which the charge store is short circuited and the charge store is electrically isolated from the power input and the intermediate power node. By short circuiting the charge store (connecting a first terminal of the charge store to a second terminal of the charge store such that the charges equilibrate) the charges in the charge store can be refreshed independent of the current drawn from the power output. As a result the apparatus draws current both as a result of current drawn from the power output and from current drawn as a result of short circuiting the charge store. In this way the dependence of the current drawn from the power input is further obfuscated from the current drawn at the power output.

In addition or as an alternative to the aforementioned techniques, in some example configurations the apparatus is configured to cause a variation in the switching frequency between a minimum switching frequency and a maximum switching frequency. The switching frequencies are chosen such that they are sufficiently high that the charge stored in the charge store is not completely depleted when operating in the second mode. When operated at lower switching frequencies the charge remaining in the charge store will be lower when the first isolation circuit is switched to the first mode and, hence, will draw a greater current each time it is charged. In contrast, when operated at the higher frequencies the charge remaining in the charge store will be higher when the first isolation circuit is switched back to the first mode and, hence, will draw a lower current each time it is charged. This approach provides a further level of obfuscation that reduces the dependence of the power output from the power input.

The switching frequency can be provided in a variety of ways. However, in some example configurations the variation in the switching frequency is a periodic variation with a variation frequency being lower than the switching frequency. The periodic variation is not limited and the switching frequency can vary between the minimum frequency and the maximum frequency in a discrete set of steps or in a continuous way. The variation can be sinusoidal or can be described using any number of frequency components. In some example configurations the frequency can be described as $f_{switch}=f_0+f(t)$ where $f_0$ is a constant switching frequency and $f(t)$ is the periodic variation which can be any arbitrary function of time bounded such that $f_{switch}$ remains between the minimum switching frequency and the maximum switching frequency. In some example configurations $f(t)$ can be represented as a Fourier series with fundamental frequency that is lower than $f_0$. For example, in some configurations $f_0$ is 125 MHz and $f(t)$ varies between plus or minus 25 MHz with a frequency of between 1 MHz and 25 MHz. In some example configurations the variation in the switching frequency is generated using spread spectrum clocking. Spread spectrum clocking techniques are techniques that deliberately spread a signal in the frequency domain to achieve a wider bandwidth.

In some example configurations the apparatus comprises a linear feedback shift register to generate the variation in the switching frequency. The linear feedback shift register is a shift register that is driven by a clock signal operating at the maximum switching frequency. The input bit of the shift register is driven using a logical function of a set of bits of the overall shift register value. In some example configurations the linear feedback shift register is driven by an XOR (exclusive or) of a subset of the bits of the shift register. The linear feedback shift register generates a stream of values in a repeating cycle. The length of the cycle is dependent on the feedback function used and the length of the shift register. In some example configurations a fixed stream with a cycle length of 512 clock cycles is used to generate the variation in the switching frequency.

In some example configurations the second isolation circuit is configured as a band pass filter with a pass band based on a difference between the minimum switching frequency and the maximum switching frequency. The second isolation circuit configured in this way allows variations on the frequency of the variation frequency to pass. In this way an output voltage can be generated that is dependent on the variation frequency. As a result the power drawn by circuitry connected to the power output is dependent on both the power characteristic of the circuitry and the variation frequency. For configurations in which the variation frequency is generated based on a linear feedback shift register the power consumption of the circuitry is rendered dependent on variation and cycle length of the linear feedback shift register.

In some example configurations the band pass filter is configured to amplify components of the intermediate voltage signal that are in the pass band. In this way the band pass filter can add a further level of obfuscation to the power consumption. In some example configurations the second isolation circuit is configured to: constrain the output voltage signal between a minimum output voltage and a maximum output voltage; when the switching frequency is the minimum switching frequency, output the minimum output voltage; and when the switching frequency is the maximum switching frequency, output the maximum output voltage. In this way the output voltage can be tailored to within a specific voltage range such that an output voltage is produced that varies between the minimum output voltage and the maximum output voltage dependent on the variation frequency.

The maximum and minimum voltages can be defined in a variety of ways. For example, a difference between the maximum and minimum voltage could be chosen to obfuscate noticeable power consumption differences of circuitry coupled to the output of the circuit. In some example configurations the second isolation circuit is configured such that the minimum output voltage and the maximum output voltage are within an allowable range of voltages of circuitry coupled to the power output. In this way a power consumption of the circuitry coupled to the power output can be varied using the switching variation whilst ensuring correct operation of the circuitry.

The output voltage signal can be variously defined. In some example configurations the second isolation circuit is configured to select a DC component of the output voltage signal based on a voltage requirement of circuitry coupled to the power output. In some example configurations the DC component of the output voltage signal is the average of the maximum operating voltage and the minimum operating voltage of the circuitry coupled to the power output. In some example configurations the DC component of the output voltage signal is defined based on an optimum operating voltage of the circuitry coupled to the power output.

The variation frequency can be defined in various ways. In some example configurations the pass band of the second isolation circuit is different to an operating frequency of circuitry coupled to the power output. In other alternative configurations the second isolation circuit is configured as a low pass filter with a cut-off frequency based on the maximum switching frequency. As a result the second isolation circuit allows frequencies associated with the variation in switching frequency to pass whilst preventing frequencies that are higher than the switching frequency from passing.

In some example configurations the power input comprises a first input power signal and a second input power signal; the intermediate power node comprises a first intermediate power node and a second intermediate power node; the first isolation circuit is configured, when in the first mode, to couple a first terminal of the charge store to the first input power signal and to couple a second terminal of the charge store to the second input power signal, and to isolate the first terminal of the charge store and the second terminal of the charge store from each of the first intermediate power node and the second intermediate power node; and the first isolation circuit is configured, when in the second mode, to couple a first terminal of the charge store to the first input intermediate power node and to couple a second terminal of the charge store to the second intermediate power node, and to isolate the first terminal of the charge store and the second terminal of the charge store from each of the first power input and the second power input. The first and second input power signals comprise the drain and source power supply voltages. In some example configurations the first input power supply is the source power supply and is set to a positive voltage. The second input power signal is the drain power supply voltage and is set to a negative voltage or to ground (zero volts). For configurations in which the first isolation circuit is also configured to operate in a third mode, when in the third mode the first terminal of the charge store is coupled to the second terminal of the charge store and both the first terminal of the charge store and the second terminal of the charge store are isolated from each of the first input power signal, the second input power signal, the first intermediate node and the second intermediate node. By providing isolation between the first input power signal and the first intermediate node, and by providing isolation between the second input power signal and the second intermediate power node, a greater level of power obfuscation can be achieved reducing the ability to measure a returned current flowing at the second input signal.

In some example configurations the first isolation circuit is a switched capacitor filter comprising one or more input switches operated at the switching frequency and one or more output switches operated at the switching frequency; the first isolation circuit is configured such that the one or more input switches couple the charge store to the first power input and the one or more output switches couple the charge store to the intermediate power node. For configurations in which the input power signal comprises a first power input signal and a second power input signal and the intermediate power node comprises a first intermediate power node and a second intermediate power node, the one or more input switches comprises a first input switch to couple a first terminal of the charge store to the first input signal, and a second input switch to couple a second terminal of the charge store to the second input signal. The one or more output switches comprise a first output switch to couple the first terminal of the charge store to the first intermediate node, and a second output switch to couple the second terminal of the charge store to the second intermediate node.

In some example configurations the first isolation circuit is configured to close the one or more input switches when the one or more output switches are open, and to close the one or more output switches when the one or more input switches are open. In this way the power input is electrically isolated from the intermediate power node at all times. The duty cycle of the one or more input switches (percentage of time for which the one or more input switches are closed) can be varied such that the one or more input switches are closed for a longer time than the one or more output switches. In alternative configurations the duty cycle can be 50% such that the one or more input switches are closed for the same amount of time as the one or more output switches. For configurations in which the first isolation circuit is configured to operate in the third mode, a third switch is provided to couple a first terminal of the charge store to a second terminal of the charge store. The first isolation circuit is further configured, in such example configurations, to cause the one or more input switches and the one or more output switches to be open when the third switch is closed, and to cause the third switch to be open when the one or more input switches are closed and when the one or more output switches are closed. As discussed, duty cycles for each of the one or more input switches, the one or more output switches and the third switch to be closed can be variously defined. In some example configurations each of the one or more input switches, the one or more output switches, and the third switch are closed for one third of the time. In other example configurations the third switch is only closed for a short time for every $N^{th}$ closure of the one or more input switches and the one or more output switches, where N is any positive integer.

The switches can be provided using a variety of different electronic components. In some example configurations transistors are used for the switches. In other example configurations each of the one or more input switches and the one or more output switches is a CMOS switch. In some example configurations the one or more input switches can be provided by an N type CMOS switch whilst the one or more output switches are provided by P type CMOS switches. In this way a same control signal can be provided for each type of CMOS switch. In other example configurations the CMOS switches for the one or more input switches and the one or more output switches are of the same type and a logical NOT gate can be provided to drive either the one or more input switches or the one or more output switches. For configurations in which the first isolation circuit is configured to operate in the third mode, a third CMOS switch is provided to couple a first terminal of the charge store to a second terminal of the charge store.

In some example configurations the apparatus further comprises protected circuitry configured to receive power from the power output. The power drawn by the protected circuitry can, in this way, be obfuscated such that it cannot be determined through measurements at the power input.

The first and second isolation circuits can take a variety of forms. In some example configurations the second isolation circuit is one of: a low dropout voltage regulator; and a switch mode power supply. Other examples of isolation circuits will be apparent to the person of ordinary skill in the art. In some example configurations the first isolation circuit operates as a low frequency isolation circuit. The low frequency isolating circuit prevents low frequency components of the power consumed at the power output from being detected at the power input. Furthermore, in some example configurations the second isolation circuit acts as a high frequency isolation circuit. The high frequency isolating circuit prevents high frequency components of the power consumed at the power output from being detected at the power input. In this way the frequency isolation of the apparatus can be tailored to the frequency response of circuitry coupled to the power output.

The apparatus can be configured to contain a single first isolation circuit and a single second isolation circuit. However, in some example configurations the first isolation circuit is one of a plurality of first isolation circuits connected in parallel between the power input and the intermediate power node; and each of the plurality of first isolation circuits is configured to operate in one of the first mode and the second mode. The operation mode of each of the plurality of isolation circuits is time dependent and each of the plurality of isolation circuits alternates between the first mode and the second mode. In some example configurations each first isolation circuit is configured to operate in one of the first mode, the second mode and a third mode at a given time and each isolation circuit is configured to alternate between these modes as described hereinabove. Furthermore, in some example configurations a plurality of second isolation circuits is also provided, each second isolation circuit is coupled to a corresponding first isolation circuit via a corresponding intermediate voltage node. Each corresponding pair of first isolation circuits and second isolation circuits are connected in parallel between the power input and the power output. By providing plural first isolation circuits and (optionally) plural second isolation circuits a further level of power obfuscation can be achieved.

The operational modes of each of the plurality of first isolation circuits can be variously defined and, by providing a degree of variation between the switching frequencies, variation frequencies, or other operational or physical parameters of each of the first isolating circuits a greater amount of power obfuscation can be achieved. In some example configurations the apparatus is configured to cause at least one of the plurality of first isolation circuits to operate in the first mode when the apparatus is in operation. In this way the apparatus is always drawing power from the power input. Furthermore, in some example configurations the apparatus is configured to cause at least one of the plurality of isolation circuits to operate in the second mode such that power is constantly provided at the power output. Further levels of obfuscation, and obfuscation against electro-magnetic attacks, can be added, for example, in some configurations the first isolation circuit of the plurality of first isolation circuits is selected using a linear feedback shift register with each first isolation circuit based on a different size charge store, different variation frequency or different switching frequency.

Particular configurations will now be described with reference to the figures.

FIG. 1a schematically illustrates an apparatus 10 for power isolation according to some example configurations. The apparatus 10 comprises a power input 14, a power output 16, a ground voltage node 26 and power isolation circuitry 12. The power isolation circuitry 12 comprises a first isolation circuit 18, a second isolation circuit 20 and a signal providing switching frequency 22 provided by an internal clock or input to the power isolation circuit from an external clock. The first isolation circuit 18 is coupled between the power input 14 and the intermediate power node 24 and is also coupled to the ground voltage node 26. The second isolation circuit 20 is coupled between the intermediate power node 24 and the power output 16. The first isolation circuit 18 comprises a charge store and is configured to operate in a plurality of modes. In a first mode the charge store is coupled to the power input 14 and the ground voltage node 26. In a second mode the charge store is coupled to the intermediate power node 24 and the ground voltage node 26. The first isolation circuit switches between the first mode and the second mode based on the switching frequency 22. The second isolation circuit 20 reduces the voltage of the intermediate power node 24 to produce an output voltage signal at the power output 16 such that a peak voltage measured between the intermediate power node 24 and the ground voltage node 26 is larger than a peak voltage measured between the power output 16 and the ground voltage node 26. Furthermore the second isolation circuit 20 filters the voltage observed at the intermediate power node 24 to remove components of the switching frequency that may be present as a result of switching between the first mode and the second mode at the switching frequency 22.

Figure 1B:
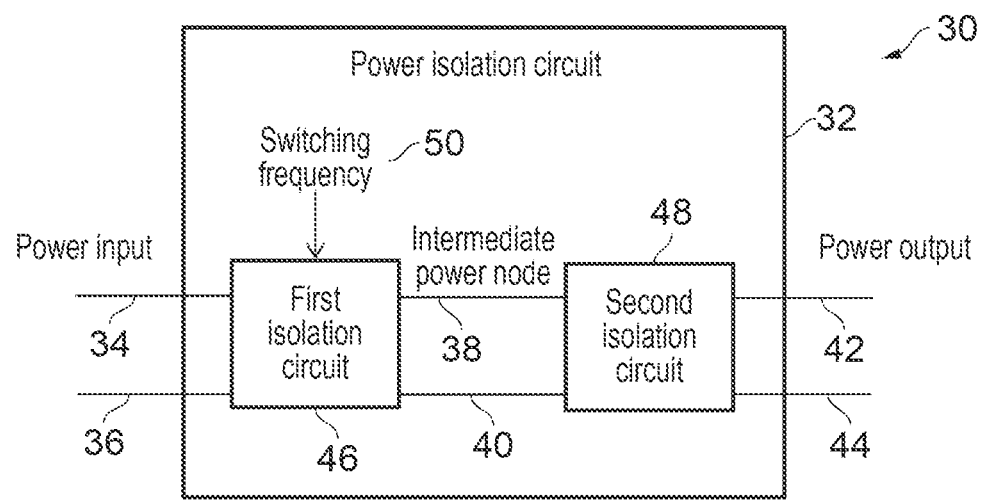
FIG. 1b schematically illustrates an apparatus for power isolation in accordance with some example configurations.

FIG. 1b schematically illustrates an alternative configuration of an apparatus 30 for power isolation according to some example configurations. The apparatus 30 comprises a power input comprising a first power input 34 and a second power input 36, a power output comprising a first power output 42 and a second power output 44, and power isolation circuitry 32. The power isolation circuitry 32 comprises first isolation circuit 46, second isolation circuit 48 and a signal providing switching frequency 50 provided by an internal clock or input to the power isolation circuit from an external clock. The first isolation circuitry 46 is coupled to the first power input 34, the second power input 36, a first intermediate power node 38 and a second intermediate power node 40. The second isolation circuit 48 is coupled to the first intermediate power node 38, the second intermediate power node 40, the first power output 52 and the second power output 44. The first isolation circuit 46 comprises a charge store and is configured to operate in a plurality of modes. In a first mode the charge store is coupled to the first power input 34 and the second power input 36. In a second mode the charge store is coupled to the first intermediate power node 38 and the second intermediate power node 40. The first isolation circuit switches between the first mode and the second mode based on the switching frequency 50. The second isolation circuit 48 reduces the magnitude of a voltage measured between the first intermediate power node 38 and the second intermediate power node 40 to produce an output voltage signal measured between the first power output 42 and the second power output 44 that is lower in magnitude than the voltage measured between the first intermediate power node 38 and the second intermediate power node 40. Furthermore the second isolation circuit 20 filters the voltage measured between the first intermediate power node 38 and the second intermediate power node 40 to remove components of the switching frequency that may be present as a result of switching between the first mode and the second mode at the switching frequency 50.

Figure 1C:
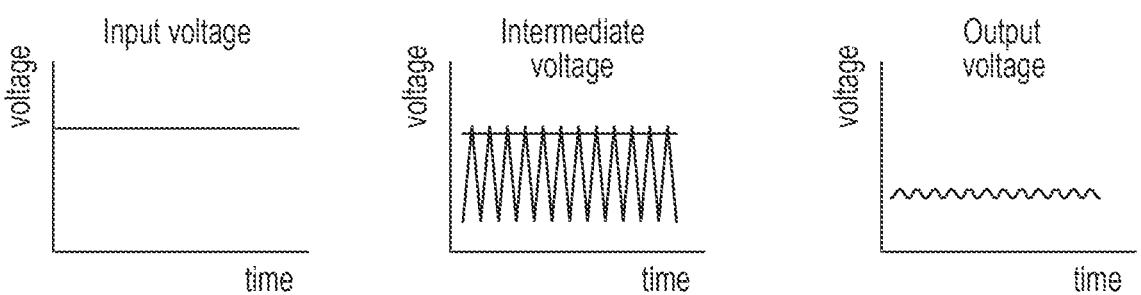
FIG. 1c schematically illustrates voltages measured at a power input, an intermediate power node and a power output of an apparatus in accordance with some example configurations.

FIG. 1c schematically illustrates a voltage measured at the power input, the intermediate voltage node and the power output. The input voltage schematically illustrates the voltage measured between the power input 14 and the ground voltage node of the apparatus 10, and the voltage measured between the first power input 34 and the second power input 26 of the apparatus 30. The intermediate voltage schematically illustrates an intermediate voltage signal measured between the intermediate power node 24 and the ground voltage node 26 of the apparatus 10, and the intermediate voltage signal measured between the first intermediate power node 38 and the second intermediate power node 40. The output voltage schematically illustrates an output voltage signal measured between the power output 16 and the ground voltage node 26 of the apparatus 10, and the output voltage signal measured between the first power output 42 and the second power output 44 of the apparatus 30. Operation of the power isolation circuit 12 will be described with reference to the circuit in FIG. 1a. It would be readily apparent to the person of ordinary skill in the art that the same description can be applied to the power isolation circuit 32 in FIG. 1b. When the first isolation circuit 18 is in the second mode the charge store of the isolation circuit 18 discharges through the second isolation circuit and the intermediate voltage decreases. When the first isolation circuit 18 subsequently switches to the first mode the charge store is recharged from the power input 14. Whilst the charge store is being charged the voltage measured at the intermediate power node 24 continues to decreases with current flow being maintained by additional charge stores (capacitances) present in the first isolation circuit 18 and/or the second isolation circuit 20. When the first isolation circuit 18 subsequently switches back to the second mode voltage measured at the intermediate power node 24 increases due to the additional charge present in the charge store of the first isolation circuit 18.

As the first isolation circuit 18 alternates between the first mode and the second mode at the switching frequency 22 the voltage measured at the intermediate voltage node 24 is seen to oscillate at the switching frequency. The total voltage variation measured at the intermediate voltage node 24 is a function of the capacity of the charge stores, the switching frequency 22 and the power drawn by the circuit. As discussed, the inventors have realised that, rather than using large components and a high switching frequency to minimise the oscillation of the power output, the second isolation circuit 20 can be used to down convert the voltage to provide a reduced output voltage. Furthermore, the second isolation circuit 20 is configured to filter frequency components at the switching frequency from the intermediate voltage. Hence, the output voltage provided at the power output 16 can be maintained over a range of voltages measured at the intermediate power node 24.

Figure 2:
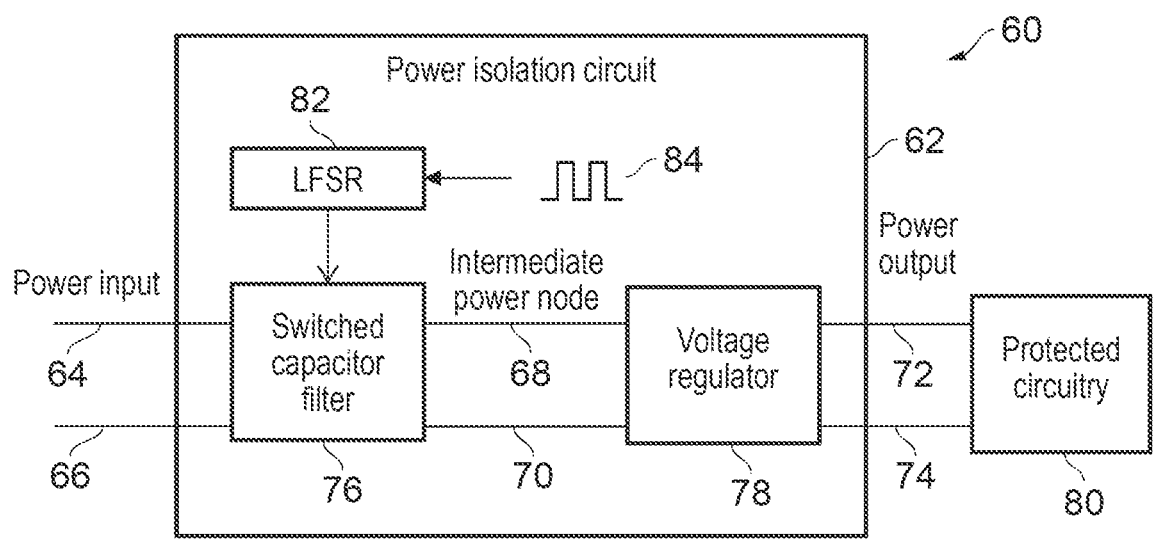
FIG. 2 schematically illustrates an apparatus for power isolation comprising protected circuitry in accordance with some example configurations.

FIG. 2 schematically illustrates further details of an apparatus 60 according to some example configurations. The apparatus comprises 60 a first power input 64, a second power input 66, power isolation circuitry 62, a first power output 72, and a second power output 74. The apparatus 60 further comprises protected circuitry 80 coupled to the first power output 72 and the second power output 74. The power isolation circuitry 62 is configured such that power used by the protected circuitry 80 cannot be easily determined from measuring current drawn at the first power input 64 or the second power input 66. The power isolation circuitry 62 comprises a switched capacitor filter 76 as the first isolation circuit. The switched capacitor filter 76 is connected between the first power input 64 and the second power input 66, and a first intermediate power node 68 and a second intermediate power node 70. The switched capacitor filter 76 operates in a first mode and a second mode as described hereinabove where the switches of the switched capacitor filter 76 are controlled by a linear feedback shift register 82 (LFSR) which is driven by a clock signal 84 operating at a maximum switching frequency of the output of the switched capacitor filter 76. The power isolation circuitry 62 further comprises a voltage regulator 78 coupled between the first intermediate power node and the second intermediate power node, and the first power output and the second power output. The voltage regulator 78 is configured to output a voltage between the first power output 72 and the second power output 74 that is lower than a voltage between the first intermediate power node 68 and the second intermediate power node 70. Both the switched capacitor filter 76 and the voltage regulator 78 provide a level of power obfuscation between the power input and the power output. In particular, the voltage regulator 78 acts to filter high frequency variations in the power consumption of the protected circuitry 80 from being detected at the first power input 64 and/or the second power input 66. The switched capacitor filter acts to filter low frequency variations in the power consumption of the protected circuitry 80 from being detected at the first power input 64 and/or the second power input 66.

Figure 3A:
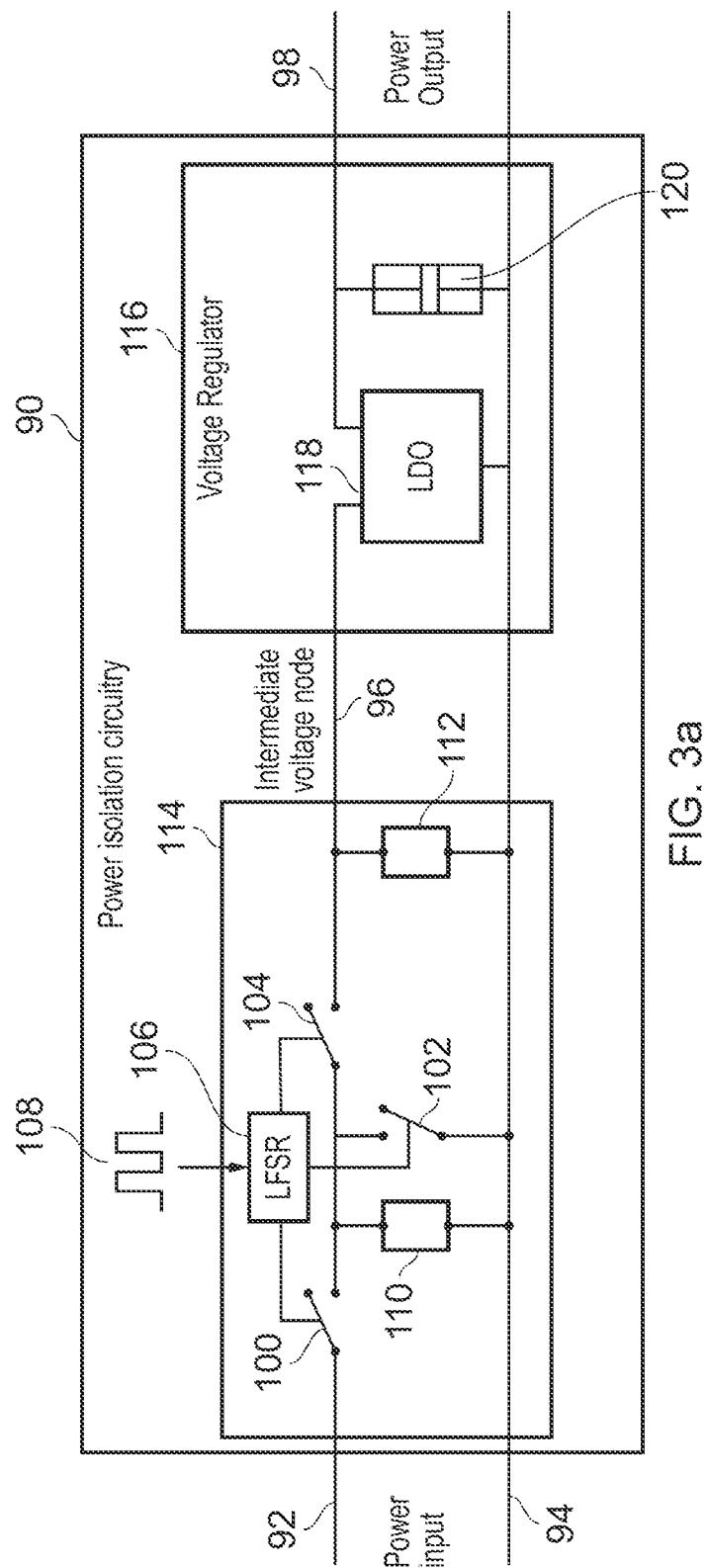
FIG. 3a schematically illustrates an apparatus for power isolation in accordance with some example configurations.
Figure 3B:
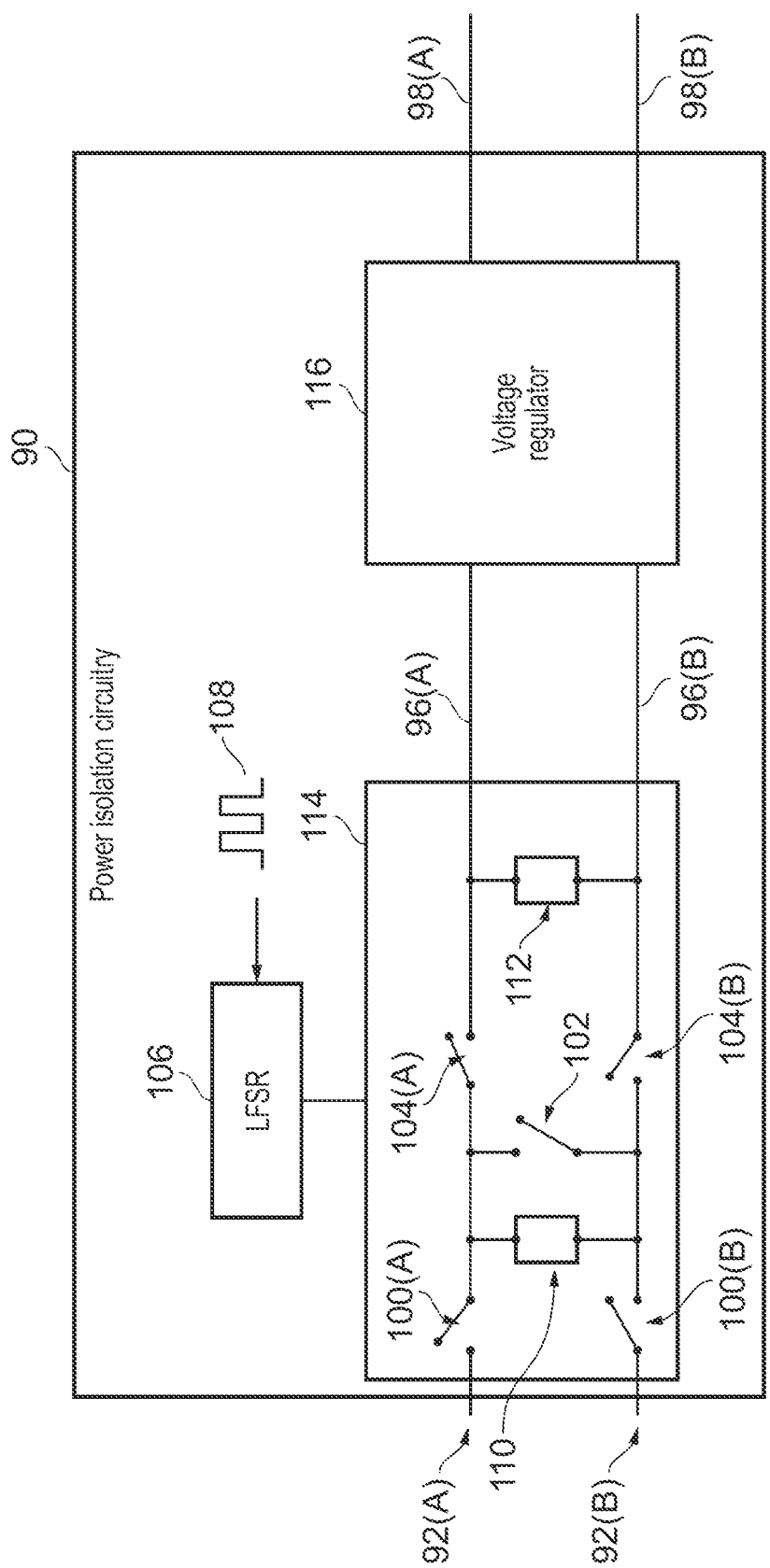
FIG. 3b schematically illustrates an apparatus for power isolation in accordance with some example configurations.

FIGS. 3a and 3b provide further details of the first isolation circuit and the second isolation circuit in accordance with some example configurations. FIG. 3a schematically illustrates power isolation circuit 90, a power input 92, a power output 98 and a ground voltage node 94. The power isolation circuit 90 comprises a first isolation circuit 114 provided as a switched capacitor filter driven by a linear feedback shift register 106 to provide a variation frequency and clock signal 108. In some example configurations the linear feedback shift register 106 is provided external to the first isolation circuit 114. The power isolation circuit 90 further comprises a second isolation circuit 116 which, in the illustrated embodiment, is provided as a voltage regulator comprising a low dropout regulator 118 and a capacitor (charge store) 120. The low dropout regulator 118 produces an output voltage signal (relative to the ground voltage node 94) at the power output 98 that is lower than a voltage measured at the intermediate voltage node 96 relative to the ground voltage node 94. The first isolation circuit 114 comprises a plurality of switches including: first switch 100 connected between the power input 92 and a first terminal of capacitor (charge store) 110; a second switch connected between the first terminal of capacitor 110 and the intermediate voltage node 96; and a third switch 102 connected between the first terminal of the capacitor 110 and the second terminal of capacitor 110 which is also connected to the ground voltage node 94. The first isolation circuit further comprises a second capacitor 112 connected between the intermediate voltage node 96 and the ground voltage node 94. The linear feedback shift register 106 comprises control circuitry to control first switch 100, second switch 104 and third switch 102 to operate based on a current state of a sequence of outputs provided by the linear feedback shift register 106. The linear feedback shift register 106 controls the first isolation circuit 114 to operate in one of a plurality of modes.

In some example configurations the first isolation circuit 114 operates in one of a first mode and a second mode controlled by the linear feedback shift register 106 driven by the clock signal 108. In the first mode the first switch 100 is closed with second switch 104 and third switch 106 open. As a result current flows from the power input 92 and charges up the capacitor 110. In the second mode the first switch 100 and the third switch 102 are open, and the second switch 104 is closed. As a result current flows from the capacitor 110 to the via the intermediate voltage node 96 to the second isolation circuit 116. In the second mode the second capacitor 112 is also charged from the capacitor 110. The second capacitor 112 and the capacitor 120 in the voltage regulator 116 provide charge for the power output when the first isolation circuit 114 is operating in the first mode.

In some example configurations the first isolation circuit is further configured to operate in a third mode controlled by the linear feedback shift register 106 driven by the clock signal 108. In the third mode the first switch 100 and the second switch 104 are open whilst the third switch 102 is closed. As a result the capacitor 110 is short circuited resulting in the charges stored in the capacitor 110 being drained. By cycling between the first mode, the second mode, and the third mode the first isolation circuit is able to provide a level of power obfuscation between the power input 92 and the intermediate voltage node 96.

The linear feedback shift register 106 switches the first isolation circuit 114 between each of the plurality of modes based on a repeated sequence of outputs. As a result the frequency at which the switching frequency varies at a variation frequency resulting in a voltage variation at the power output 98. The additional power obfuscation provided by the linear feedback shift register will be described in detail in relation to FIGS. 4-6 below.

FIG. 3b schematically illustrates an alternative configuration of the first isolation circuitry according to some example configurations. Components of FIG. 3b which are the same as those in FIG. 3a have been assigned the same reference numeral and are configured as described with reference to FIG. 3a. In FIG. 3b first switch 100 has been replaced with first plurality of switches 100 comprising first input switch 100(A) and second input switch 100(B). Similarly, second switch 104 has been replaced with second plurality of switches 104 comprising first output switch 104(A) and second output switch 104(B). The power input 92 comprises first power input 92(A) and second power input 92(B). Intermediate power node 96 comprises first intermediate power node 96(A) and second intermediate power node 96(B). The power output 98 comprises first power output 98(A) and second power output 98(B). The first power input 92(A) is connected to the first terminal of the capacitor 110 via first input switch 100(A) and the second power input 92(B) is connected to the second terminal of the capacitor 110 via the second input switch 100(B). Switches 100(A) and 100(B) operate together such that when in the first mode switch 100(A) and switch 100(B) are both closed and in the second mode and the third mode switch 100(A) and switch 100(B) are both open. As described in relation to FIG. 3a switch 102 is connected between the first terminal of the capacitor 110 and the second terminal of the capacitor 110. Switch 104(A) is connected between the first terminal of the capacitor 110 and the first intermediate power node 96(A). Switch 104(B) is connected between the second terminal of capacitor 110 and the second intermediate power node 96(B). When operating in the second mode switch 104(A) and switch 104(B) are closed. When operating in the first mode or the third mode switch 104(A) and switch 104(B) are open. Second capacitor 112 is connected between the first intermediate power node 96(A) and the second intermediate power node 96(B). By providing first switches 100(A) and 104(A) between the first power input 92(A) and the first intermediate power node 96(A), and second switches 100(B) and 104(B) between the second power input 92(B) and the second intermediate power node 96(B) a greater level of power obfuscation can be achieved as both the source power signal and the drain power signal are obfuscated.

Figure 4:
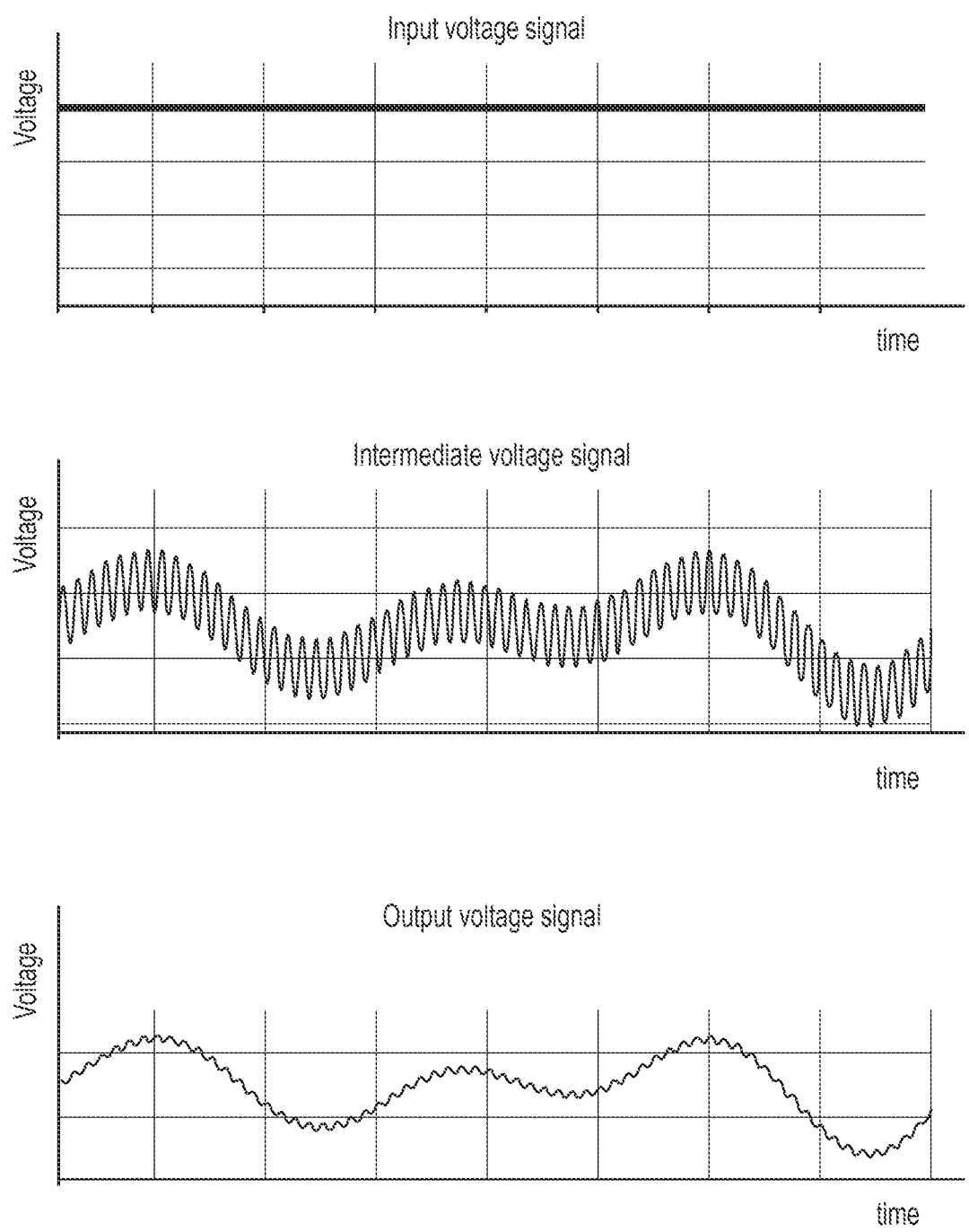
FIG. 4 schematically illustrates voltages measured at a power input, an intermediate power node and a power output of an apparatus in accordance with some example configurations.

FIG. 4 schematically illustrates the effect of the first isolation circuit and the second isolation circuit on the voltage measured at the power input, the intermediate voltage node, and the power output as a function of time. The input voltage signal measured at the power input is assumed constant. The intermediate voltage signal, measured at the intermediate power mode, is dependent on the signal generated by the linear feedback shift register 106. As discussed in relation to FIG. 1, when the first isolation circuit is in the second mode charge flows from the capacitor 110 via the intermediate voltage node 96 and into the voltage regulator 116. This discharges the capacitor 110 and the voltage measured at the intermediate voltage node decreases. Whilst in the second mode (second switch 104 closed, first switch 100 and third switch 102 open) the second capacitor 112 is charged by the capacitor 110 to provide a charge store for use whilst the capacitor 110 is being charged. At each clock cycle from clock signal 108 the state of the linear feedback shift register 106 advances to a next state by shifting in a new bit determined based on the current state of the shift register. If the new bit is the same as a preceding new bit then the mode of the first isolation circuit 114 remains the same. If however the new bit is different to the preceding new bit then the mode of the first isolation circuit 114 changes. In this way the time in which the first isolation circuit 114 remains in the second mode is variable. If the first isolation circuit 114 remains in the second mode for a short time (for example 1 clock cycle) then the capacitor 110 will discharge by a first amount. If the first isolation circuit 114 remains in the second mode for a longer time (2 or more clock cycles) then the capacitor 110 will discharge by a second amount that is greater than the first amount. Once the first isolation circuit has transitioned to the first mode (first switch 100 closed, second switch 104 and third switch 102 open) the capacitor 110 begins to charge from the power input 92. During the charging power is provided to the power output from the intermediate voltage node 96. The total time spent in the first mode varies dependent on a current position in the sequence of states of the linear feedback shift register 106. Hence, when the first isolation circuit 114 switches back to the first mode the voltage at the intermediate voltage node will have decreased by an amount that varies dependent on the position in the sequence of states of the linear feedback shift register 106. Similarly, the total charge held by the capacitor 110 will also vary dependent on the time that the capacitor 110 has been charging. Hence, in addition to the charging/discharging cycle observed due to the switching frequency, a slower variation in the intermediate voltage is seen dependent on the state of the linear feedback shift register 106. As discussed in relation to FIG. 1, the second isolation circuit 116 is configured to filter the intermediate voltage signal to reduce the variation in voltage that is observed due to the switching frequency. However, the second isolation circuit 116 is configured as a low pass filter or as a band pass filter to allow the low frequency variation, that is observed due to the variation frequency, to pass resulting in an output voltage that is dependent on the variation frequency.

Figure 5:
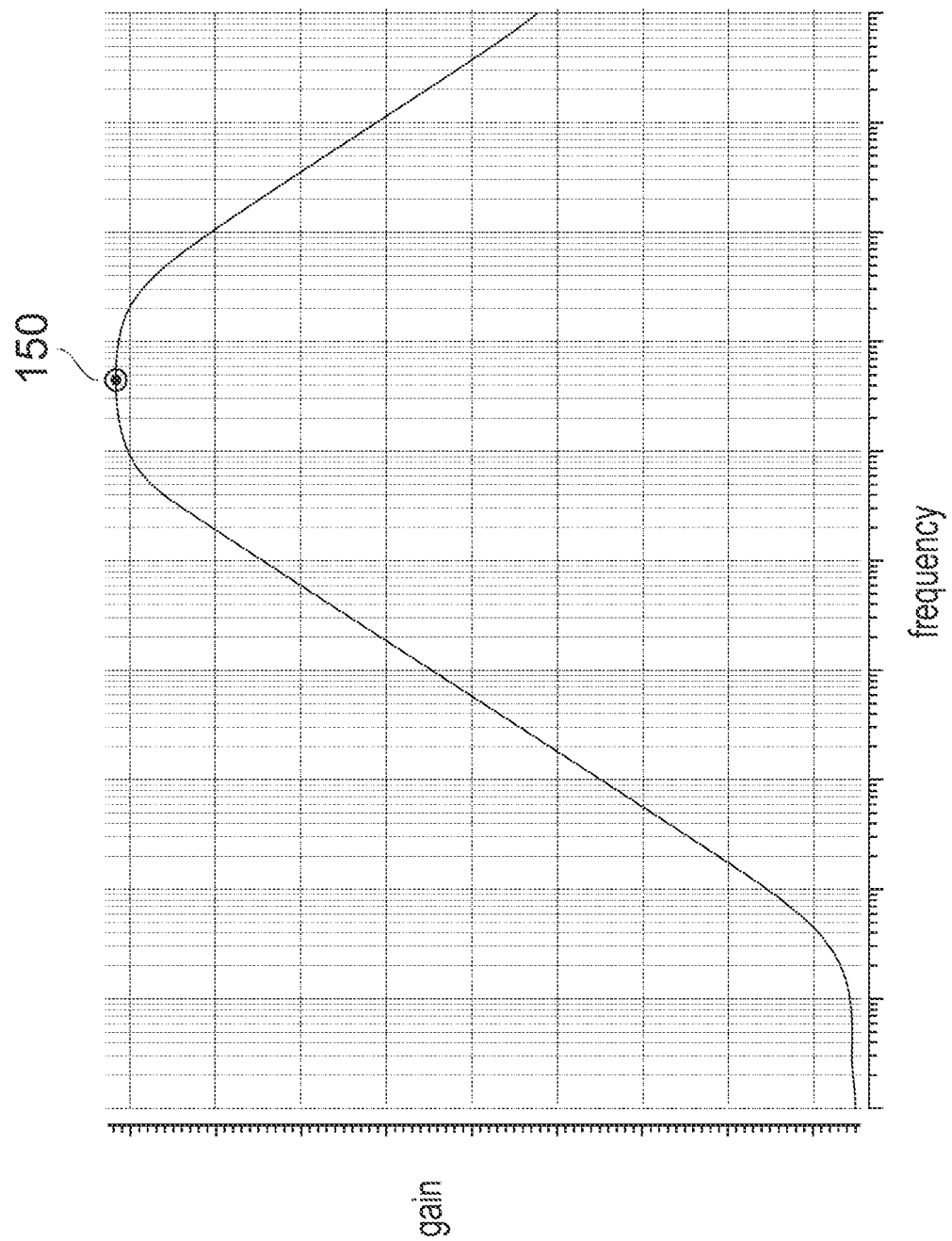
FIG. 5 schematically illustrates a frequency response of an apparatus in accordance with some example configurations.

FIG. 5 schematically illustrates a linear-log plot of a gain characteristic of the second isolation circuit 116. The variation in gain with frequency is shown, with the gain represented on the vertical, linear scale and the frequency shown on the horizontal, log scale. The second isolation circuit is configured to filter frequencies that different to the variation frequency 150 but to allow the variation frequency 150 to pass. The gain at the variation frequency 150 is selected to ensure that an output voltage of the second isolation circuit is within a voltage range that is suitable for operating circuitry that is to be coupled to the power output 98 of the apparatus. The time dependent voltage variation of the power output 98 results in a variation in the current drawn at the power input 92 when the power output 98 is connected to circuitry requiring a particular power. As a result current measured at the power input 92 is dependent on both the power consumption at the power output 98 and the variation frequency resulting from the linear feedback shift register 106 driven by the clock signal 108.

Figure 6A:
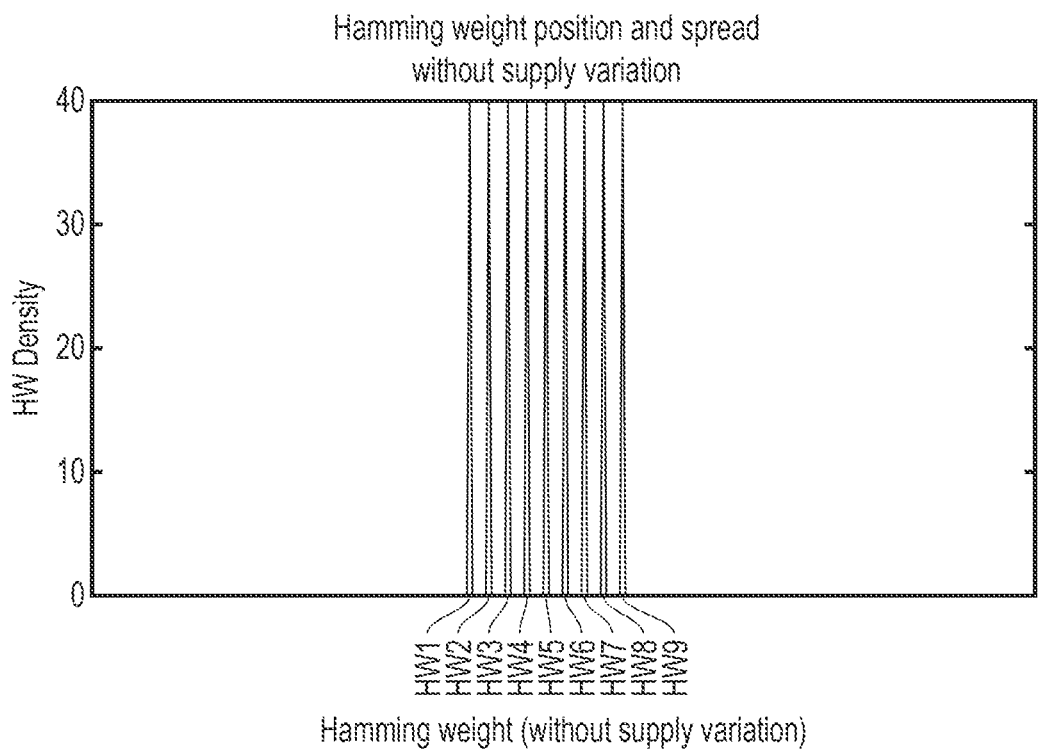
FIG. 6a schematically illustrates a hamming weight density for an apparatus for power isolation in accordance with some example configurations.
Figure 6B:
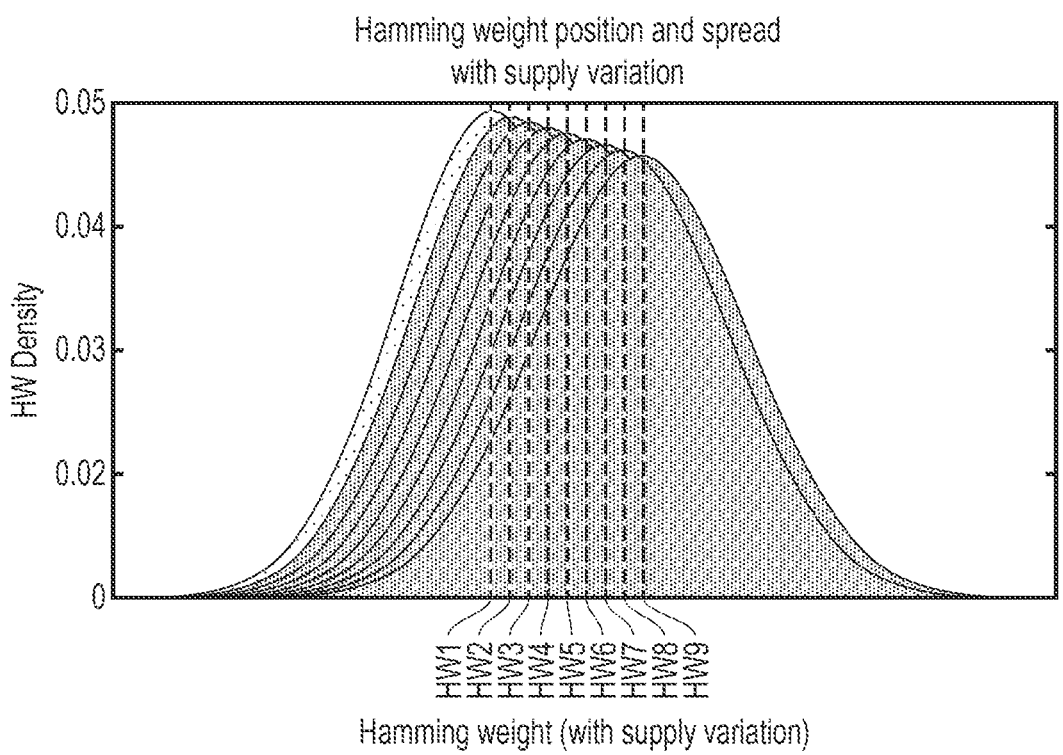
FIG. 6b schematically illustrates a Hamming weight density for an apparatus for power isolation in accordance with some example configurations.

The effect of the variation frequency is schematically illustrated in FIGS. 6a and 6b. The power isolation circuitry 90 is configured to provided power obfuscation such that the operation of protected circuitry connected to the power output 98 cannot be inferred through measurements of power consumption at the power input 92. A typical approach that may be used to attempt to infer the operation of the protected circuitry is the determination of Hamming weights associated with operation of the protected circuitry. The Hamming weights refer to a difference between bits set within a logical value, for example, the number of bits set in a byte. Typically, the setting of a bit to a logical 1 requires more power than leaving the same bit set to a logical zero. As such, one approach to determining the operation of the protected circuitry could be through repeated measurements of power consumption of the protected circuit where differences in the measured power consumption can then be correlated to determine a number of logical ones that have been set. By way of example, if the role of the processing circuit involves setting bits within a byte of data there are 9 possible combinations of different numbers of logical ones that can be set (0, 1, 2, . . . , 7, 8). Hence, there are 9 different Hamming weights (9 potentially detectable responses of the protected circuit involving setting different numbers of bits) associated with the data processing circuitry each corresponding to an amount that the byte of data has been changed from an all zero state.

FIG. 6a schematically illustrates the Hamming weight distribution of protected circuitry 80, protected by a power isolation circuit 60 (illustrated in FIG. 2), in which the switching of the first isolation circuit is at a constant frequency resulting in an output voltage as illustrated in FIG. 1c. The follow description is applicable to any of the power isolation circuits described in the above example configurations in which the switching of the first isolation circuit is at a constant frequency. In this case repeated measurements result in a discrete set of Hamming weights thereby enabling information regarding the operation of the protected circuitry coupled to the power output to be inferred from the power input. In contrast, FIG. 6b schematically illustrates the Hamming weight distribution for protected circuitry 80, protected by any of the power isolation circuits described in the above example configurations, in which a linear feedback shift register 106 is used to generate a time variant voltage at the power output 98. As discussed this renders the power consumption of the power isolation circuitry 90 and the protected circuitry that is coupled to the power output 98 dependent on the state of the linear feedback shift register 106. As a result the measured power consumption of the device for a fixed Hamming weight will vary resulting in the spread of measurements observed in FIG. 6b and the merging of the Hamming weights. As a result, it is no longer possible to determine information relating to the state of the processing circuitry using this method. Furthermore, this approach adds obfuscation for electro-magnetic attacks.

Figure 7A:
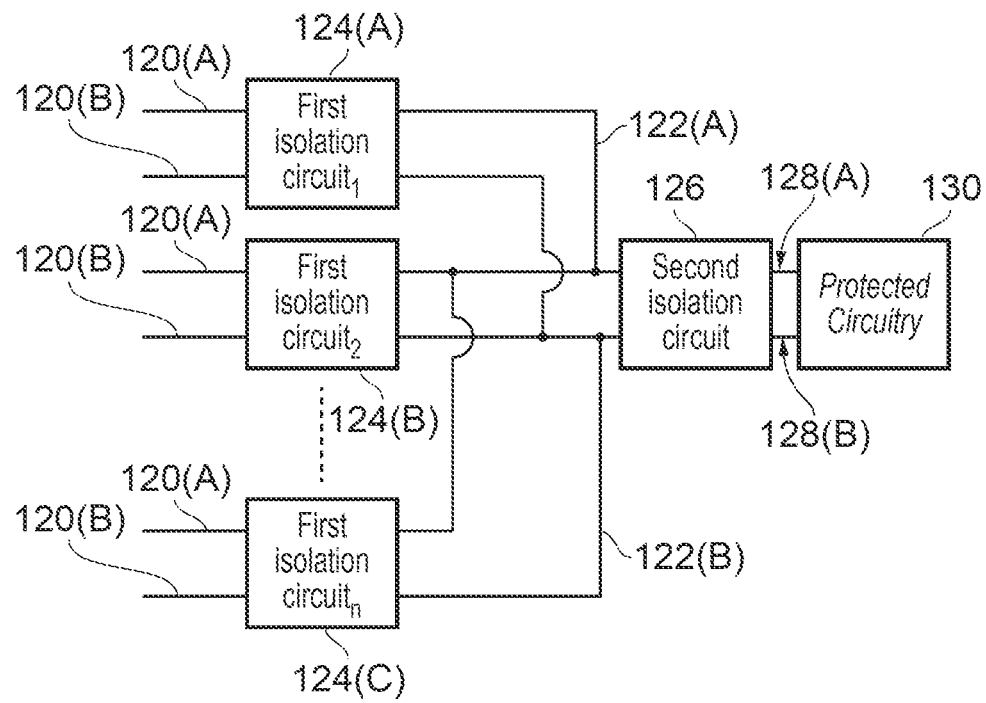
FIG. 7a schematically illustrates an apparatus for power isolation in accordance with some example configurations.

FIG. 7a schematically illustrates an apparatus according to some example configurations. The apparatus comprises a plurality of first isolation circuits 124 each connected to a same power input 120 comprising first power input 120(A) and second power input 120(B). Each of the plurality of first isolation circuits 124 can be configured according to any configuration described herein and each operates in one of a first mode and a second mode. In some example configurations each of the plurality of first isolation circuits is also configured to operate in the third mode as previously discussed. In some example configurations the apparatus is configured such that the operational modes of each of the plurality of first isolation circuits are staggered such that at least one of the plurality of first isolation circuits 124 operates in the first mode at a given time and at least one of the plurality of first isolation circuits 124 operates in the second mode at a given time. The plurality of first isolation circuits 124 are each coupled to first intermediate power node 122(A) and second intermediate power node 122(B). The apparatus is provided with a second isolation circuit 126 coupled to the first intermediate power node 122(A) and the second intermediate power node 122(B). The second isolation circuit 126 can be configured to operate based on any of the configurations described above. The second isolation circuit is coupled to the protected circuitry 130 via the first power output 128(A) and the second power output 128(B). As a result the apparatus is able to switch between which first isolation circuit of the plurality of first isolation circuits 124 provides power to the second isolation circuit 126 and the protected circuitry 130. In some example configurations a further level of obfuscation is obtained by incorporating a different linear feedback shift register into each of the plurality of first isolation circuits 124. In alternative example configurations each first isolation circuit 124 is driven by a same linear feedback shift register resulting in a lower circuit area.

Figure 7B:
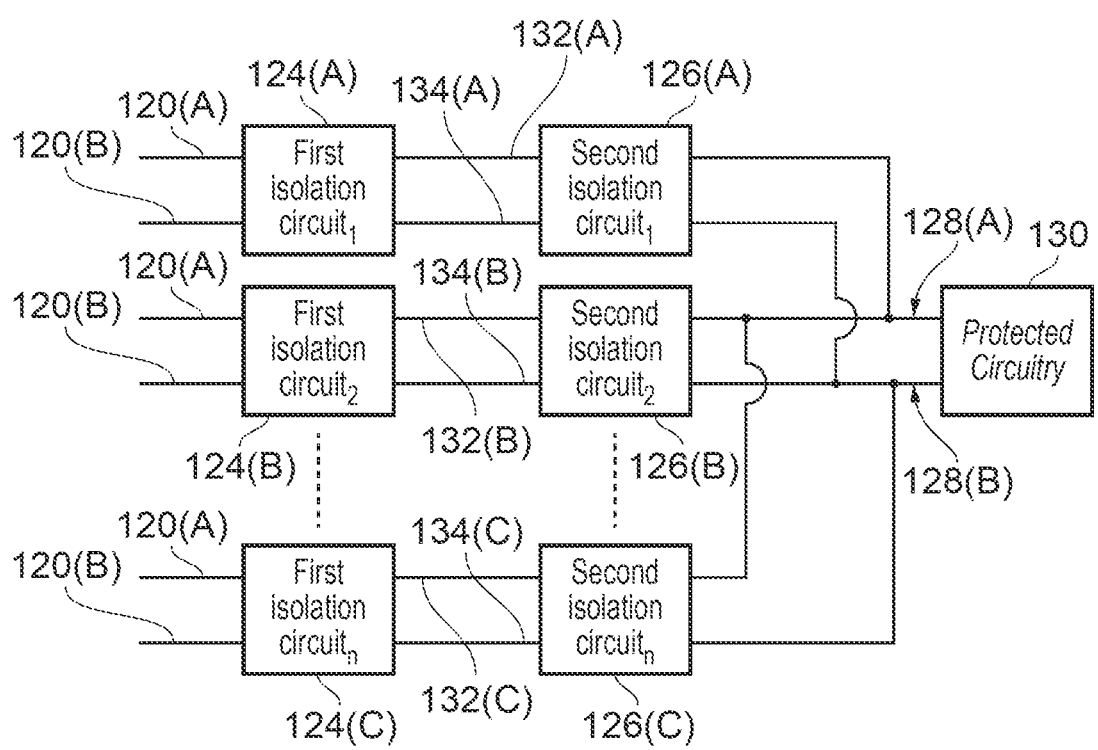
FIG. 7b schematically illustrates an apparatus for power isolation in accordance with some example configurations.

FIG. 7b schematically illustrates an apparatus according to some example configurations. The apparatus in FIG. 7b is similar to that set out in FIG. 7a with the additional feature of a plurality of second isolation circuits 126 each corresponding to one of the plurality of first isolation circuits 124 and connected by a separate first intermediate power node 132 and a separate second intermediate power node 134. For example the first isolation circuit 124(A) is coupled to the second isolation circuit 126(A) via the first intermediate power node 132(A) and the second intermediate power node 134(A). The first isolation circuit 124(B) is coupled to the second isolation circuit 126(B) via the first intermediate power node 132(B) and the second intermediate power node 134(B). The first isolation circuit 124(C) is coupled to the second isolation circuit 126(C) via the first intermediate power node 132(C) and the second intermediate power node 134(C). In this way a further level of obfuscation can be obtained by providing second isolation circuits 126 with modified frequency responses. Hence, dependent on which of the plurality of first isolation circuits 124 is configured to operate in the second mode, a different power measurement may be made for a same operation of the protected circuitry 130.

In brief overall summary there are provided apparatuses and methods. The apparatuses comprise a power input and a power output and a first isolation circuit comprising a charge store. The first isolation circuit is configured to switch between a first mode and a second mode at a switching frequency. In the first mode the charge store is coupled to the power input and is electrically isolated from an intermediate power node. In the second mode the charge store is coupled to the intermediate power node and is electrically isolated from the power input. The apparatuses further comprise a second isolation circuit electrically coupled to the intermediate power node and the power output. The second isolation circuit is configured to output an output voltage at the power output. The second isolation circuit is configured to generate the output voltage by filtering the intermediate voltage signal to reduce signal components at the switching frequency.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
   a power input;
   a power output;
   a first isolation circuit comprising a charge store and configured to switch between a first mode and a second mode at a switching frequency, wherein in the first mode the charge store is coupled to the power input and is electrically isolated from an intermediate power node, and in the second mode the charge store is coupled to the intermediate power node and is electrically isolated from the power input; and
   a second isolation circuit electrically coupled to the intermediate power node and the power output, and configured to output an output voltage signal at the power output of lower voltage than an intermediate voltage signal of the intermediate power node, wherein the second isolation circuit is configured to generate the output voltage signal by filtering the intermediate voltage signal to reduce signal components at the switching frequency.

2. The apparatus of claim 1, wherein the first isolation circuit is further configured to operate in a third mode in which the charge store is short circuited and the charge store is electrically isolated from the power input and the intermediate power node.

3. The apparatus of claim 1, wherein the apparatus is configured to cause a variation in the switching frequency between a minimum switching frequency and a maximum switching frequency.

4. The apparatus of claim 3, wherein the variation in the switching frequency is a periodic variation with a variation frequency being lower than the switching frequency.

5. The apparatus of claim 4, further comprising a linear feedback shift register to generate the variation in the switching frequency.

6. The apparatus of claim 5, wherein the second isolation circuit is configured to select a DC component of the output voltage signal based on a voltage requirement of circuitry coupled to the power output.

7. The apparatus of claim 3, wherein the variation in the switching frequency is generated using spread spectrum clocking.

8. The apparatus of claim 3, wherein the second isolation circuit is configured as a band pass filter with a pass band based on a difference between the minimum switching frequency and the maximum switching frequency.

9. The apparatus of claim 8, wherein the band pass filter is configured to amplify components of the intermediate voltage signal that are in the pass band.

10. The apparatus of claim 8, wherein the second isolation circuit is configured to:
    constrain the output voltage signal between a minimum output voltage and a maximum output voltage;
    when the switching frequency is the minimum switching frequency, output the minimum output voltage; and
    when the switching frequency is the maximum switching frequency, output the maximum output voltage.

11. The apparatus of claim 10, wherein the second isolation circuit is configured such that the minimum output voltage and the maximum output voltage are within an allowable range of voltages of circuitry coupled to the power output.

12. The apparatus of claim 8, wherein the pass band of the second isolation circuit is different to an operating frequency of circuitry coupled to the power output.

13. The apparatus of claim 3, wherein the second isolation circuit is configured as a low pass filter with a cut-off frequency based on the maximum switching frequency.

14. The apparatus of claim 1, wherein:
    the power input comprises a first input power signal and a second input power signal;
    the intermediate power node comprises a first intermediate power node and a second intermediate power node;
    the first isolation circuit is configured, when in the first mode, to couple a first terminal of the charge store to the first input power signal and to couple a second terminal of the charge store to the second input power signal, and to isolate the first terminal of the charge store and the second terminal of the charge store from each of the first intermediate power node and the second intermediate power node; and
    the first isolation circuit is configured, when in the second mode, to couple a first terminal of the charge store to the first input intermediate power node and to couple a second terminal of the charge store to the second intermediate power node, and to isolate the first terminal of the charge store and the second terminal of the charge store from each of the first power input and the second power input.

15. The data processing apparatus of claim 1, wherein:
the first isolation circuit is a switched capacitor filter comprising one or more input switches operated at the switching frequency and one or more output switches operated at the switching frequency;
the first isolation circuit is configured such that the one or more input switches couple the charge store to the first power input and the one or more output switches couple the charge store to the intermediate power node.

16. The data processing apparatus of claim 15, wherein the first isolation circuit is configured to close the one or more input switches when the one or more output switches are open, and to close the one or more output switches when the one or more input switches are open.

17. The data processing apparatus of claim 15, wherein each of the one or more input switches and the one or more output switches is a CMOS switch.

18. The apparatus of claim 1, further comprising protected circuitry configured to receive power from the power output.

19. The apparatus of claim 1, wherein the second isolation circuit is one of:
a low dropout voltage regulator; and
a switch mode power supply.

20. The apparatus of claim 1, wherein the first isolation circuit operates as a low frequency isolation circuit.

21. The apparatus of claim 1, wherein the second isolation circuit acts as a high frequency isolation circuit.

22. The apparatus of claim 1, wherein:
the first isolation circuit is one of a plurality of first isolation circuits connected in parallel between the power input and the intermediate power node; and
each of the plurality of first isolation circuits is configured to operate in one of the first mode and the second mode.

23. The apparatus of claim 22, wherein the apparatus is configured to cause at least one of the plurality of first isolation circuits to operate in the first mode when the apparatus is in operation.

24. A method of operating an apparatus comprising:
switching a first isolation circuit between a first mode and a second mode at a switching frequency, wherein in the first mode a charge store is coupled to a power input and is electrically isolated from an intermediate power node, and in the second mode the charge store is coupled to the intermediate power node and is electrically isolated from the power input;
generating an output voltage signal at a power output of lower voltage than an intermediate voltage signal of the intermediate power node, the output voltage signal generated from the intermediate voltage signal filtered to reduce signal components at the switching frequency.

* * * * *